(12) United States Patent
Yeo et al.

(10) Patent No.: US 8,432,598 B2
(45) Date of Patent: Apr. 30, 2013

(54) TRANSPARENT CONDUCTOR STRUCTURE

(75) Inventors: Jong-Souk Yeo, Corvallis, OR (US); Gregg Alan Combs, Monmouth, OR (US); Tim R. Koch, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 774 days.

(21) Appl. No.: 12/626,489

(22) Filed: Nov. 25, 2009

(65) Prior Publication Data

US 2011/0120749 A1 May 26, 2011

(51) Int. Cl.
*G02B 26/00* (2006.01)
*G03G 17/04* (2006.01)
*G09G 3/34* (2006.01)

(52) U.S. Cl.
USPC ............. 359/237; 359/295; 359/296; 430/32; 345/107

(58) Field of Classification Search .................. 359/237, 359/245, 260–263, 298, 301–303, 317–318, 359/577, 290–292, 198, 223–225, 295, 296; 345/49, 107; 430/31, 32
See application file for complete search history.

(56) References Cited

U.S. PATENT DOCUMENTS

| | | | |
|---|---|---|---|
| 6,985,132 B2 * | 1/2006 | Nomura et al. | 345/107 |
| 2002/0135861 A1 * | 9/2002 | Nakao et al. | 359/296 |
| 2003/0202136 A1 | 10/2003 | Stephenson et al. | |
| 2005/0012977 A1 * | 1/2005 | Mizuno | 359/245 |
| 2007/0099095 A1 | 5/2007 | Rudin | |
| 2007/0128905 A1 | 6/2007 | Speakman | |
| 2008/0286447 A1 | 11/2008 | Alden et al. | |

* cited by examiner

*Primary Examiner* — Dawayne A Pinkney

(57) ABSTRACT

A transparent conductor structure includes a transparent, insulating substrate and a discontinuous, transparent conducting layer established on the substrate. The discontinuous conducting layer is partitioned into a plurality of segments, each of which has a thickness ranging from about 1 nm to about 10 μm. Two or more of the segments are connected together by i) a metal trace disposed on or between them, or ii) a mesh, formed from a plurality of metal traces, disposed across a surface of the segments.

22 Claims, 11 Drawing Sheets

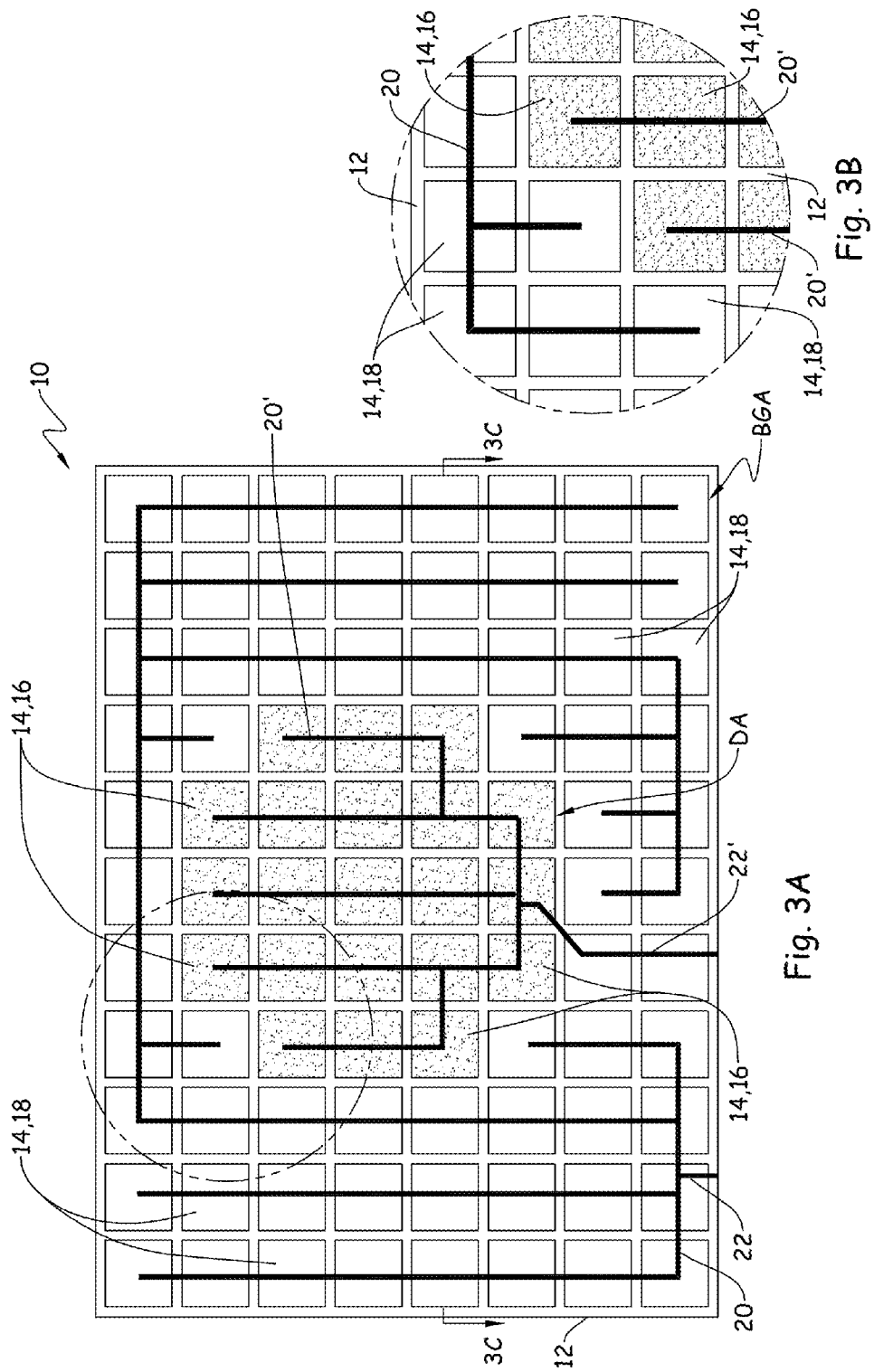

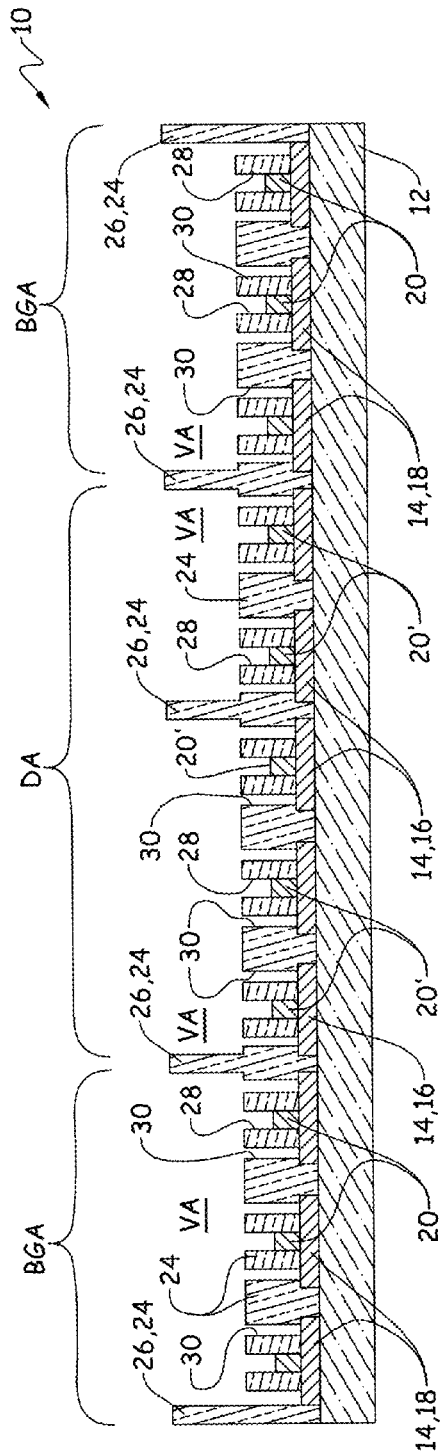
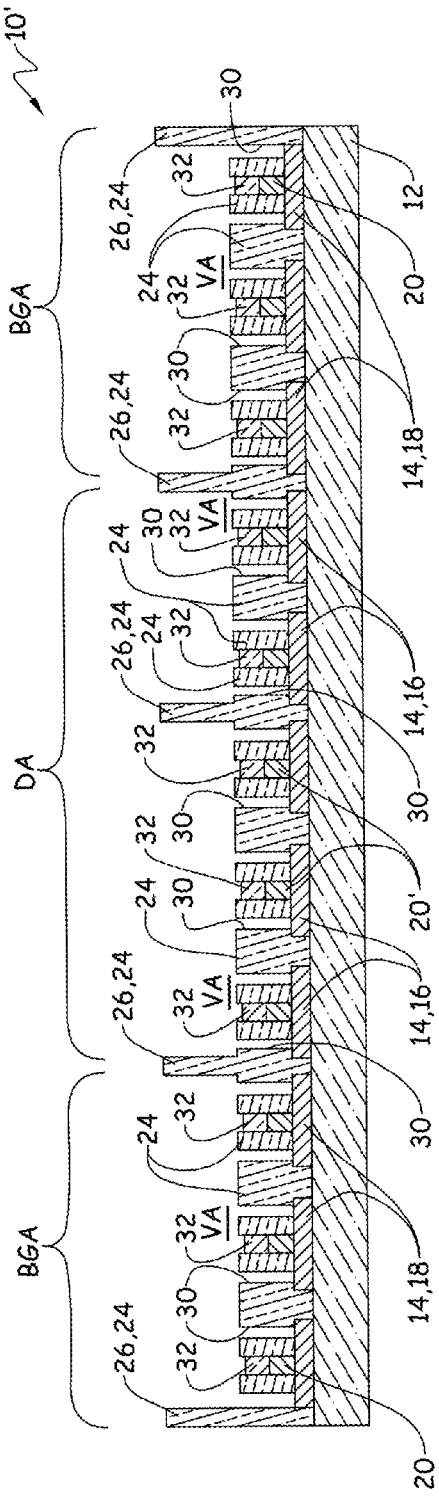
Fig. 5
Fig. 6

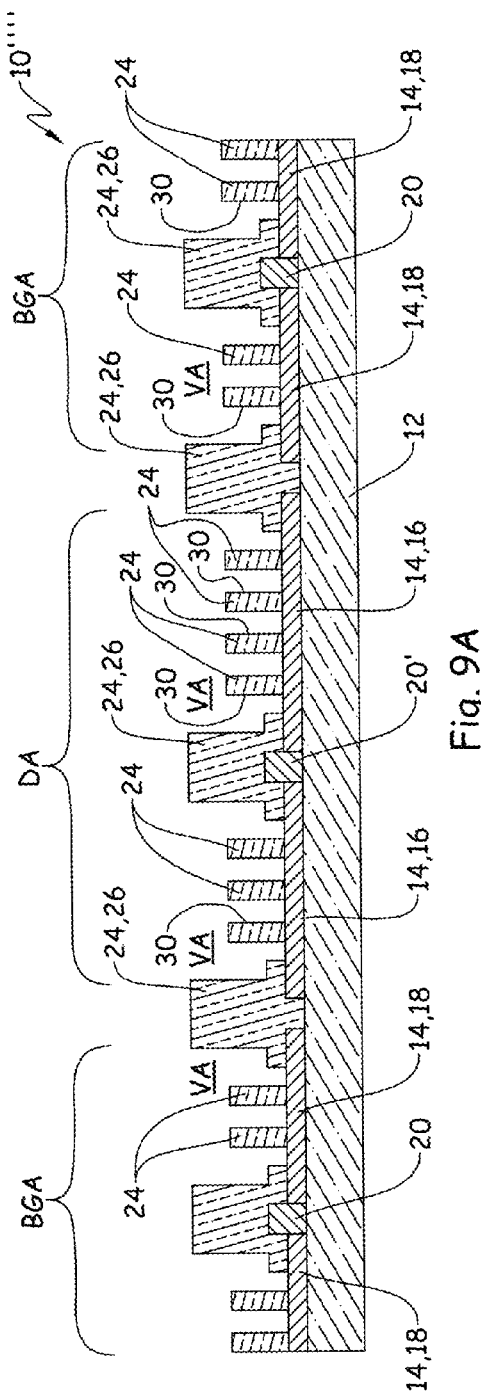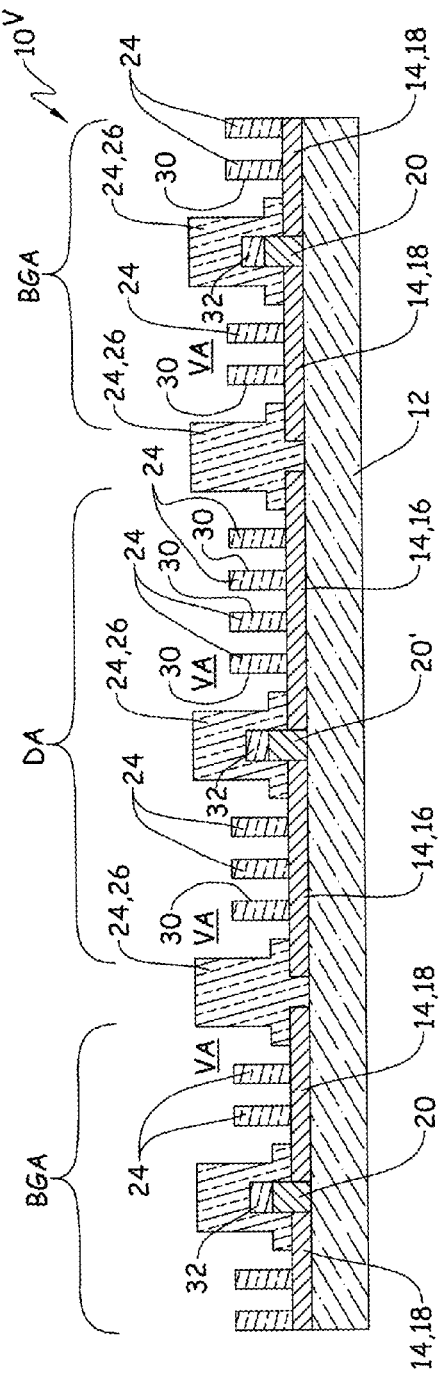

TRANSPARENT CONDUCTOR STRUCTURE

BACKGROUND

The present disclosure relates generally to transparent conductor structures.

Many electro-optical displays include transparent conductor structures. Such structures are often used for electronic paper (also referred to as e-paper) in a form of display technology often designed to produce visible images that have a similar appearance to printed paper. Electrophoretic and electrokinetic displays are two examples of e-paper. An electrophoretic display generally uses electrophoresis to move charged particles in an electrophoretic medium under the influence of an external electric field. The charged particles may also be rearranged in response to changes in the applied electric field to produce visible images. An electrokinetic display generally uses electrokinetic phenomena, such as electrophoresis, electroconvection, electrochemistry, and/or combinations thereof, which may involve current flow as a switching mechanism in order to produce visible images.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3A is a top view of an embodiment of a transparent conductor structure;

FIG. 3B is an enlarged view of the circled portion of the transparent conductor structure of FIG. 3A;

FIG. 5 is a cross-sectional view of one embodiment of the transparent conductor structure including metal traces;

FIG. 6 is a cross-sectional view of one embodiment of the transparent conductor structure including a dielectric material established on a portion of the metal traces;

FIG. 9A is a cross-sectional view of one embodiment of the transparent conductor structure including metal traces formed beneath structure walls;

FIG. 9B is a cross-sectional view of another embodiment of the transparent conductor structure including metal traces formed beneath structure walls and including a white reflector or black absorber positioned in inactive regions;

DETAILED DESCRIPTION

Embodiments of the transparent conductor structure disclosed herein advantageously include metal traces configured to enhance the transmission and conductivity of the structure, while not deleteriously affecting the desirable clear aperture ratio of the active portions of the structure. The metal traces are used in conjunction with a relatively thin transparent conducting layer. The metal traces serve as a super highway for electrons, while the transparent conducting layer serves as a charge dissipation layer. The combination of such elements advantageously enables charge to be substantially uniformly distributed across the surface of the transparent conductor structure. Such uniform distribution activates the display substantially uniformly at a relatively fast rate.

Furthermore, the embodiments of the transparent conductor structure disclosed herein are designed to enhance the transparency, speed, and flexibility of the display in which it is used. As such, the structures may be included in any electro-optical display for which such properties are required and/or desired.

"Clear aperture ratio" as used herein is the ratio of the area occupied by the transparent region to the total area (including transparent and opaque regions). Higher clear aperture ratios result in a brighter display in the clear state using reflectors in reflective displays. In one embodiment, the clear aperture ratio ranges from 90% to 99%. In another embodiment, the clear aperture ratio ranges from 80% to 90%. In still another embodiment, the clear aperture ratio ranges from 50% to 80%.

Figure 1A:
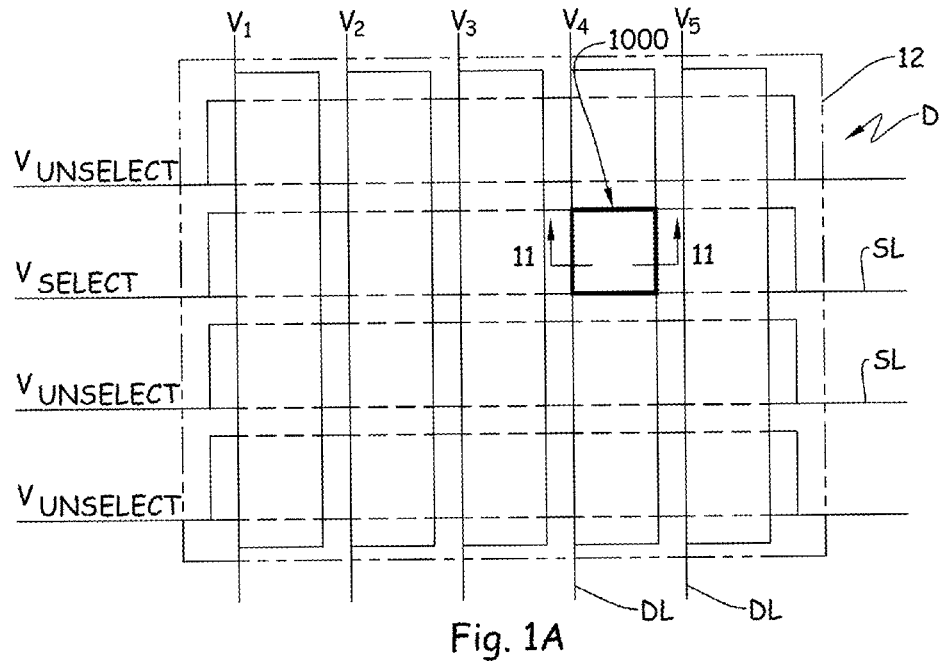
FIG. 1A schematically depicts an embodiment of a display including a passively addressed matrix of display elements.
Figure 1B:
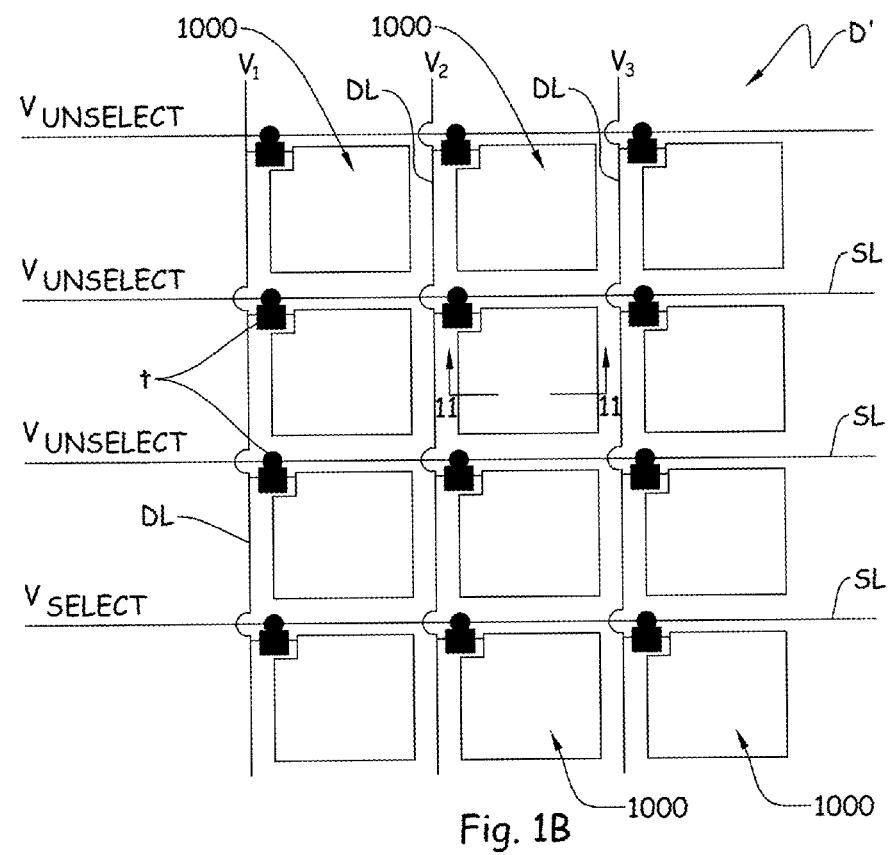
FIG. 1B schematically depicts an embodiment of a display including an actively addressed matrix of display elements.

Non-limiting examples of a display D are schematically shown in FIGS. 1A and 1B. The display D generally includes at least one display element 1000 established on a surface of a substrate 12. As shown in FIGS. 1A and 1B, the display D, D', includes several display elements 1000 arranged on the substrate 12 in a two-dimensional array, where the display elements 1000 are disposed in straight lines to form a substantially square lattice. It is to be understood that the display elements 1000 may be disposed in any other arrangement. Examples of such other arrangements in which the display elements 1000 may be disposed include, but are not limited to, arrangements in square lattices, hexagonal lattices, rectangular lattices, and substantially triangular lattices.

As also shown in FIGS. 1A and 1B, the display elements 1000 are established on the substrate 12 in a single level. The display elements 1000 may, in another embodiment, be stacked in two or more levels on the substrate 12. Such configuration of the stacking is referred to herein as "multi-level stacking". For instance, a multi-level stack including two layers of the display elements 1000 may include a first series of the elements 1000 established on one side of the substrate 12, and another series of elements 1000 established on an opposing side of the substrate 12. Such multi-level stacking arrangements enable colored images to be produced by the display D, D'.

As also shown in FIGS. 1A and 1B, the display D, D' may include several individual display elements 1000 arranged on the substrate 12 in rows and in columns. In other embodiments, the display elements 1000 may be provided as individual segments. In any event, each element 1000 or segment of elements 1000 is/are generally driven by at least two electrodes: an electrode placed along each select line SL; and an electrode placed along each data line DL. It is to be understood that although the electrode placed along the select line SL and the electrode placed along the data line DL technically cross at each of the display elements 1000, the display element 1000 architecture (which will be described in detail below) electrically isolates one electrode from another.

The display D, D' may also be configured to be driven via a number of different addressing schemes, such as, e.g., passive matrix addressing (using the configuration shown in FIG. 1A) and active matrix addressing (using the configuration shown in FIG. 1B). The display D depicted in FIG. 1A is an example of a display that uses passive addressing to form visible images. During passive addressing, selected rows of the display elements 1000 (one element 1000 is labeled in the figure at one intersection of two electrodes, but it is to be understood that a display element/pixel 1000 is formed at each intersection of the two electrodes) are written with optical states determined by an electric potential difference between select lines SL and data lines DL. The respective voltages are denoted in the figure as $V_{select}$, $V_{unselect}$, and $V_1$, $V_2$, $V_3$, $V_4$, $V_5$. Each display element 1000 in non-selected rows generally maintains its state without active driving circuitry (e.g., transistors, etc.) until the row containing such display elements 1000 is selected. The voltage applied to the element 1000 is the difference between the data line DL potential, denoted in FIG. 1A as $V_4$, and the selected line potential denoted in FIG. 1A as $V_{select}$. Passive matrix addressing is often used in, but not limited to, liquid crystal displays, electronic papers, or the like.

The display D' shown in FIG. 1B is an example of a display that uses active addressing to form visible images. The display D' may be actively addressed by connecting each display element 1000 to, e.g., a transistor "t" or other switching device and actively maintaining a state of one display element 1000, while one or more other element(s) 1000 is/are being addressed. The respective voltages are denoted in the figure as $V_{select}$, $V_{unselect}$, and $V_1$, $V_2$ and $V_3$. Active matrix addressing typically enables relatively fast display refresh times, as compared to passively addressed displays, since the refresh time depends, at least in part, on the speed of the transistor "t" rather than on the speed of an optical effect. Active addressing is often used in, but not limited to, video displays. Since the individual display elements 1000 are individually addressed in the embodiment shown in FIG. 1B, it is to be understood that the transparent conductor structures disclosed herein (which include segmented electrodes) may be desirable for some specific actively addressable applications (e.g., electronic signage applications).

Another example of a display (not shown in FIG. 1A or 1B) may include one that is directly addressed. In direct addressing, each display element 1000 is individually driven by its own data line.

Figure 2A:
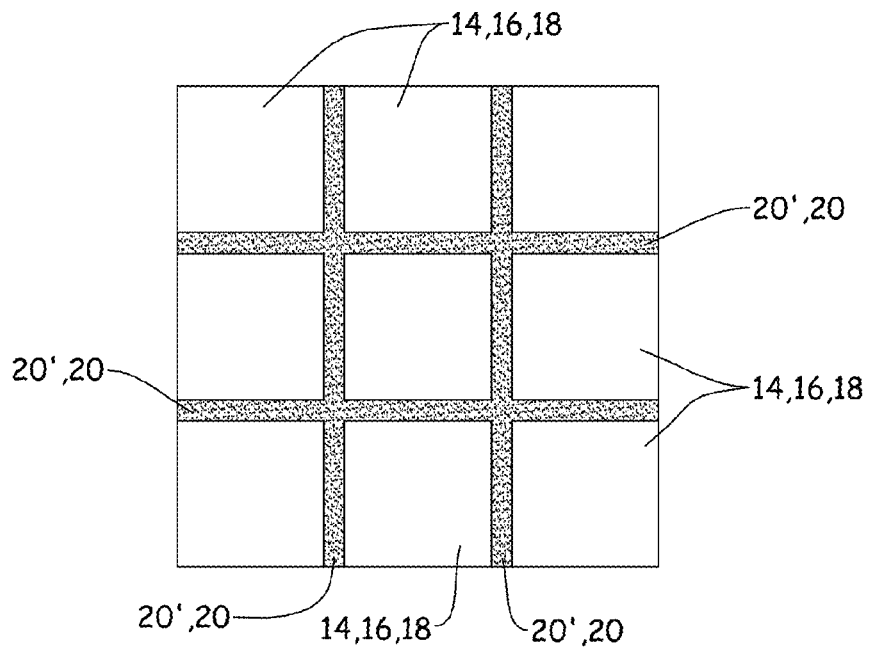
FIG. 2A is a top view of an embodiment of a transparent conductor structure including respective metal traces positioned between segments.
Figure 2B:
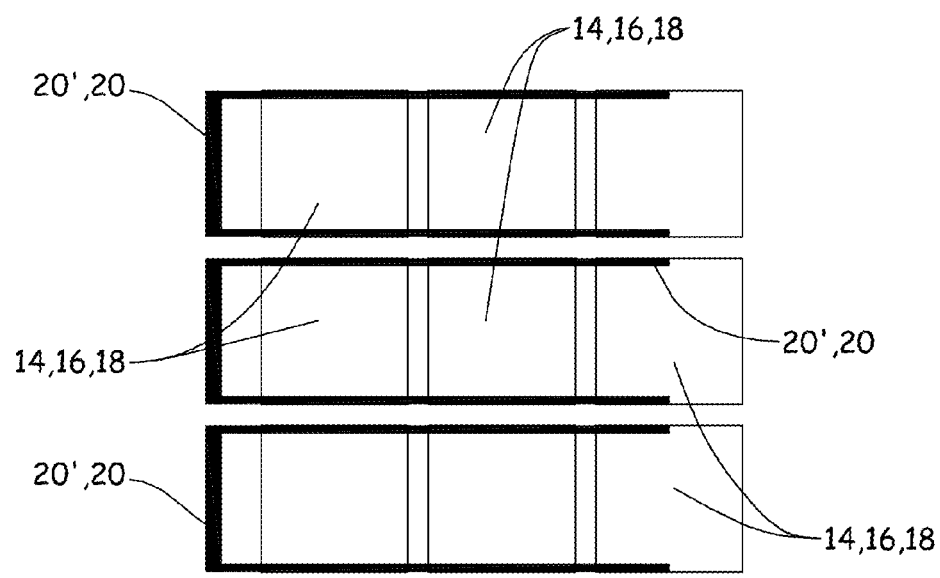
FIG. 2B is a top view of an embodiment of a transparent conductor structure including metal traces operatively connected to each other and placed on the segments.
Figure 2C:
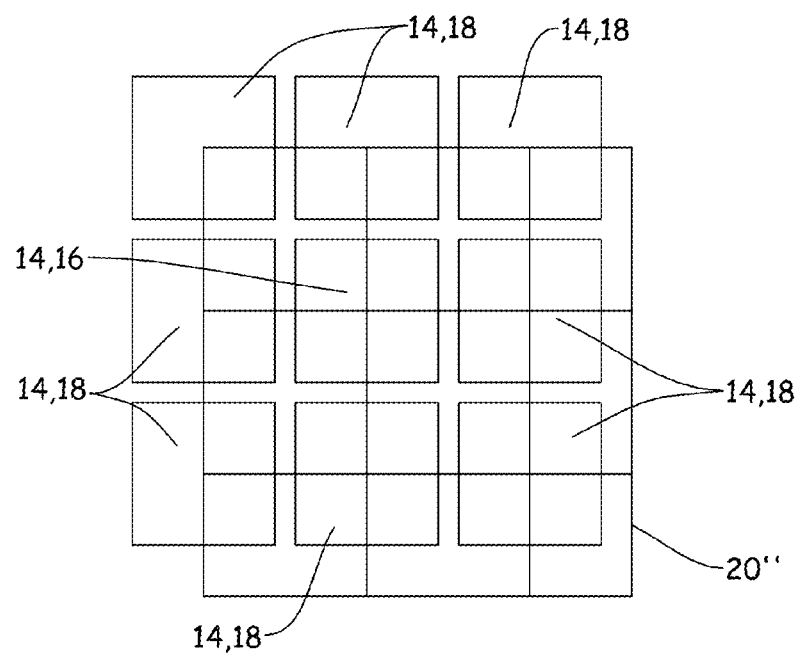
FIG. 2C is a top view of an embodiment of a transparent conductor structure including a mesh of metal traces.

Referring now to FIGS. 2A through 2C, general embodiments of portions of a transparent conducting structure are depicted. These Figures illustrate a transparent conducting layer 14 divided into a plurality of isolated segments 16 or 18 (i.e., not physically touching other segments 16 or 18), and the electrical connection of such segments 16 or 18 using metal traces 20' or 20 positioned on or between such segments 16 or 18. As discussed further hereinbelow in reference to FIGS. 3A through 3C, the segments 16, 18 may be positioned on a substrate 12 to respectively form a display area DA and a background area BGA of the resulting transparent conducting structure 10 (note that the final structure 10, the substrate 12, and the areas DA, BGA are not shown in FIGS. 2A through 2C).

As used herein, the term metal trace(s) 20, 20' refers to i) respective wires/lines positioned between two predetermined segments 16, 18, ii) to a single wire/line addressing two or more predetermined segments 16, 18 or a predetermined area of a continuous transparent conducting layer (shown as 14' in FIG. 10), iii) a plurality of non-crossing wires operatively connected together so that predetermined wires connect to one or more areas of predetermined segments 16, 18 or a predetermined area of the continuous transparent conducting layer 14', or iv) a mesh of wires which includes a plurality of wires operatively crossing at non-zero angles such that a region of the transparent conducting layer 14 (or 14') adjacent to the various cross-points may be selectively activated. FIGS. 2A through 2C illustrate various configurations of the metal traces 20' or 20 operatively connecting segments 16 or 18. It is to be understood that various methods for making such configurations and various materials for the components (e.g., 14, 16, 18, 20, 20') are described further herein in reference to other figures.

FIG. 2A illustrates the metal traces 20' or 20 positioned between segments 16 or 18. While the traces 20' or 20 are shown between all of the segments 16 or 18, it is to be understood that the metal traces 20' or 20 may be selectively established so that row or columns of the segments 16 or 18 may be addressed.

FIG. 2B illustrates an embodiment in which the metal traces 20' or 20 are established on a surface of, and along two edges of, each of the segments 16 or 18 in a particular row. Generally, the presence of two conductive traces 20' or 20 on each segment 16 or 18 is for redundancy. It is to be understood that in other embodiments, a single metal trace 20' or 20 may also be established on the surfaces of the segments 16 or 18 (e.g., down the center of the segments 16 or 18 as shown in FIG. 3A), or in another arrangement that effectively delivers charge to the underlying segment 16 or 18. In the embodiment shown in FIG. 2B, each row of segments 16 or 18 may be individually addressed, and thus may be used as a row electrode for a passive matrix addressing application. Such segments 16 or 18 may also be rotated 90° and used as column electrodes in a passive matrix addressing application.

FIG. 2C illustrates the metal traces 20' or 20 as the mesh 20". It is to be understood that if a mesh of wires is used, the pitch of the mesh 20" is generally equal to or less than the pitch of the segments 16, 18.

Figure 3C:
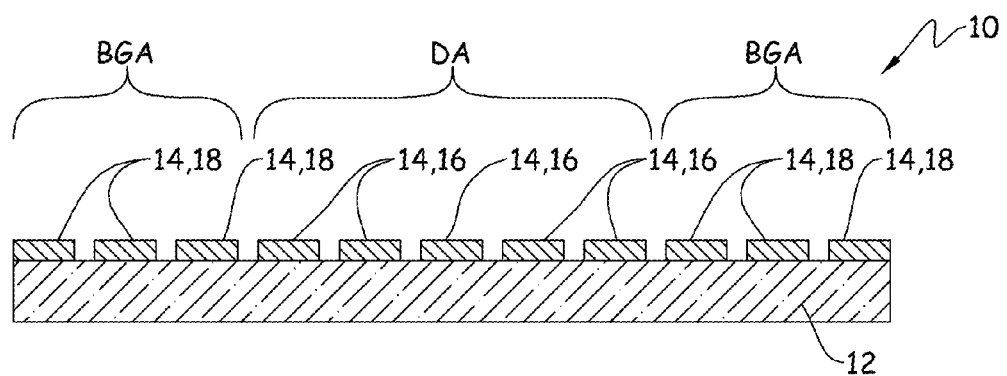
FIG. 3C is a cross-sectional view taken along line 3C-3C of FIG. 3A.

Referring now to FIGS. 3A through 3C, a top view (FIG. 3A), an enlarged portion of the top view (FIG. 3B), and a cross-sectional view (FIG. 3C) of one embodiment of the transparent conductor structure 10 are depicted. As shown in FIG. 3A, the structure 10 generally includes the previously mentioned display area DA and background area BGA. While both the display area DA and the background area BGA are part of the viewing area of the structure 10, the display area DA is addressable separately from the background area BGA, and the background area BGA is often used to provide contrast for the display area DA. The configuration of the areas DA and BGA in each display element 1000 enables the entire display D, D' to be completely transparent or completely opaque. The shading of the display area DA in FIGS. 3A and 3B is for illustrative purposes and to clearly distinguish the background area BGA from the display area DA. A more detailed description of the components and materials of the respective areas DA, BGA is set forth hereinbelow.

The display and background areas DA, BGA are formed on the substrate 12. The substrate 12 is a transparent insulating material. A suitable transparent insulating material is one that allows visible light to pass therethrough and is non-conducting. Non-limiting examples of suitable substrates 12 include glass, various polymers, and/or the combinations thereof. If a polymer is used, non-limiting examples of suitable polymers include polycarbonates (PC), polyacrylates (PAR), polyimides (PI), polyethylene terephthalate (PET), polyethylene naphthalate (PEN), polyethersulphone (PES), polyolefins, polycyclic olefin (PCO), polyetheretherketone (PEEK), and/or combinations thereof. The substrate 12 may either be flexible or rigid. A flexible substrate is one that can be bent, flexed, conformed, or rolled to a radius of curvature of equal to or less than a few centimeters without losing functionality.

The display area DA includes the transparent conducting layer 14 that is electrically isolated from the transparent conducting layer 14 in the background area BGA. It is to be understood that the isolated sections of the transparent conducting layer 14 may be pre-patterned sections formed on the substrate 12 when obtained, or may be formed by depositing the transparent conducting layer 14 and then patterning the layer to form the respective areas DA and BGA.

In some instances (and as shown in FIGS. 3A through 3C), the respective sections of the transparent conducting layer 14 are further patterned to form a plurality of segments (labeled 16 in the display area DA and labeled 18 in the background area BGA). Such segments 16, 18 are shown in FIG. 3C without additional structure 10 components for clarity. The segments 16, 18 are mechanically isolated from one another, which isolation is believed to enhance the flexibility and durability of the structure 10.

Mechanical isolation of the segments 16, 18 with electrical connection through more compliant and highly conductive metal traces 20', 20 provides several benefits leading to mechanical durability. These benefits include, but are not limited to: i) thinner transparent conductor segments 16, 18 (since most of the charge is now carried through the metal traces 20', 20) effectively reduce strain on the conductor layer 14, ii) the smaller segments 16, 18 increase the characteristic failure strain, thus reducing the possibility of crack initiation, iii) the surfaces of the substrate 12 that are exposed between the segments 16, 18 release elastic strain energy, thus reducing the possibility of crack propagation, iv) if a crack is initiated in a segment 16, 18, such a crack is confined to the segmented region rather than propagating through the full width of the layer 14, which may cause detrimental failure of the structure 10, and v) mechanical isolation of the segments 16, 18 leaves some room to prevent buckling failure under compressive stress state. Each of these benefits enhances the flexibility and durability of the resulting structure 10.

Non-limiting examples of suitable transparent conducting materials that form the transparent conducting layer 14 and the segments 16, 18 include inorganic transparent conductors, organic transparent conductors, a subwavelength structured metal layer, a thin transparent metal layer (i.e., a metal layer having from 80% to 90% transparency), a network of nanostructures (i.e., a discontinuous layer of nanoparticles, nanotubes, nanowires, etc. having gaps between at least some of the structures, where the gaps provide the transparent state of the network), and combinations thereof.

Non-limiting examples of the inorganic transparent conductor include indium tin oxide (ITO) (which can be used to dissipate charge in a hybrid electrode), indium zinc oxide (IZO), titanium nitride (TiN), zinc oxide (ZnO:Al), tin oxide ($SnO_2$:F), zinc indium oxide ($Zn_2In_2O_5$), gallium indium oxide (($GaIn)_2O_3$), and other inorganic, transparent, and conductive materials. Non-limiting examples of the organic transparent conductor include polyethylene dioxythiophene (PEDOT), polyacetylene (PAc), polyaniline (PAni), polypyrrole (PPy), polythiophene (PTs), derivatives thereof, and other organic, transparent, and conductive materials. Derivatives of the organic transparent conductor include any of the organic, transparent, and conductive materials listed herein that are doped or loaded with additional organic or inorganic materials to improve conductivity. An additional charge hopping mechanism is incorporated into the organic, transparent, and conductive materials by virtue of the additional organic, inorganic, metallic, and/or nanoscale materials. Non-limiting examples of such derivatives include PEDOT doped with polystyrene sulfonate (PEDOT:PSS) or PEDOT loaded with carbon nanotubes or conductive nanoparticles.

It is to be understood that the transparent conductor 14 in any of the embodiments disclosed herein may be formed (e.g., via self-assembly) or patterned (e.g., via photolithography) such that it has a pitch of stochastic or regular structures in the subwavelength scale to allow enhanced transmission. It is to be understood that metal materials and some organic, inorganic, or metallic (i.e., materials containing at least some metal therein) materials may be formed as subwavelength structures. In some embodiments, a suitable average pitch may be below the visible wavelength (i.e., 400 nm). A pitch of the transparent conductor 14 in the subwavelength scale reduces surface reflection (i.e., allows incoming light to pass through without substantial loss due to reflection) and improves optical performance of the layer 14.

In one embodiment, a self-assembly process may be used to form a subwavelength structured metal layer. In such embodiments, it is to be understood that the resulting layer may be made up of metal islands (i.e., the segments 16, 18) that are not completely connected, but are capable of acting as a charge dissipation layer. Any suitable metal may be used for this embodiment of the transparent conducting layer 14.

As further stated above, the transparent conductor 14 may alternately be formed from a network of nanostructures, e.g., a discontinuous layer of nanoparticles, nanotubes, nanowires, etc. having gaps between at least some of the structures. The nanostructures have at least one dimension on the nanoscale (i.e., ranging from about 1 nm to any sub-micron (e.g., a few hundred nanometers)). When a network of nanostructures is selected for the transparent conducting layer 14, it is to be understood that the particles, tubes, wires, etc. in the network allow the transfer of electrons, while the gaps allow for optical transparency. Non-limiting examples of suitable nanostructures include silver nanowires, carbon nanotubes, or other conductive nanoparticles, nanotubes, nanowires, etc. It is to be understood that an optically clear (i.e., transparent) matrix (e.g., the organic or inorganic materials discussed herein) may also have such conductive nanostructures embedded herein.

In still another embodiment, the conducting layer 14 is established as a thin, uniform continuous layer of metal. In one embodiment, this thin metal layer has a thickness that is less than the optical penetration depth (i.e., the thickness of an optical medium that causes light to attenuate to 1/e (37%) of its initial value). The transparency of this film may be, in some instances, greater than 90%. Such desirable light transmission is achieved because light continues to propagate without much attenuation for the thin metal layer.

The thickness of the transparent conducting layer 14 (and thus the segments 16, 18) generally ranges from about 1 nm to about 10 µm, but may vary, depending upon the material used for the layer 14. In an embodiment in which the inorganic conductor is utilized, the thickness of the layer 14 ranges from about 5 nm to about 1000 nm. In an embodiment in which the organic conductor is utilized, the thickness of the layer 14 ranges from about 10 nm to about 3 µm. In an embodiment in which the subwavelength structured layer is utilized, the thickness of the layer 14 ranges from about 1 nm to about 100 nm. In an embodiment in which the network of nanostructures is used, the thickness of the network ranges from about 3 nm to about 300 nm. In an embodiment in which the thin transparent metal layer is used, the thickness of the layer 14 ranges from about 1 nm to about 50 nm.

The geometry of the segments 16, 18 depends, at least in part, on the desired requirements of the structure 10, and is selected so that substantially uniform charge dissipation occurs therein. As illustrated in FIGS. 3A-3C, the geometry includes squares. However, it is to be understood that other suitable geometries include rectangles, circles, or any other geometry that enables uniform charge dissipation. In one embodiment, the segment 16, 18 shape is symmetric about its associated metal trace 20', 20. This symmetrical geometry may be particularly suitable for achieving uniform charge dissipation when poor conductors are utilized as the segments 16, 18. It is to be understood however, that the segments 16, 18 may also have asymmetrical geometries about the associated metal trace(s) 20', 20, and that such asymmetrical geometries may be most desirable in instances where highly conductive materials are used.

In some instances, the edges of the segments 16, 18 may be smooth (i.e., does not include notches) in order to lower the stress concentration factor and to reduce the potential for crack-onset. The formation of the segments 16, 18 will be described further herein in reference to FIGS. 4A through 4D.

Also shown in FIGS. 3A and 3B are metal traces 20 and 20'. The embodiment of the metal traces 20, 20' shown in FIGS. 3A and 3B includes one set of traces 20 that selectively addresses the background segments 18 and another set of traces 20' that selectively addresses the display segments 16. One or more electrical leads 22, 22' (which are operatively connected to respective contact pads (not shown)) may be connected to each of the respective sets of traces 20, 20' in order to separately address the segments 16 in the display area DA and the segments 18 in the background area BGA. The metal traces 20, 20' enable electrical signals to be directed to one or more of the segments 16, 18. In the embodiment shown in FIGS. 3A and 3B, each of the segments 16 or 18 is addressed when the traces 20' or 20 are electrically activated by leads 22', 22, respectively. In an alternate embodiment, each segment 16, 18 may be selectively addressed if multiple leads 22', 22 and non-connected traces 20', 20 are used.

In the embodiment of FIGS. 3A and 3B, each set of traces 20, 20' includes a plurality of wires operatively connected together so that predetermined wires electrically and operatively connect to predetermined segments 16 or 18. As depicted, each segment 16, 18 is associated with one trace 20', 20, but one trace 20', 20 may be operatively and electrically connected to multiple segments 16, 18. It is to be understood that the pattern of the metal traces 20, 20' and the connection of such traces 20, 20' to the segment(s) 16, 18 may be configured in any suitable manner as long as the desired clear aperture ratio and transparency are achieved at such areas of the structure 10 (see, e.g., FIGS. 2A through 2C). Other examples of such patterns and connections are described further herein in reference to at least FIGS. 4A through 4D.

The metal traces 20, 20' are formed of electrically conductive metals (such as, e.g., gold, aluminum, nickel, copper, silver, platinum, etc.), alloys thereof, multi-layer structures thereof (e.g., multiple layers of the same metal or different metals), or combinations thereof, and have a width or diameter ranging from about 1 µm to about 100 µm. In one embodiment, the metal traces 20, 20' have a predefined surface selected from a structured surface, a textured surface, a porous surface, and combinations thereof. This type of surface may be configured so that the metal traces 20, 20' function as a white reflector or a black absorber. A white reflective surface is formed when the surface is structured to uniformly reflect all the visible wavelength of light with an average pitch ranging from the sub-micron level to a few tens of microns. A black absorbing surface is formed when the surface is structured to be absorptive or anti-reflective for visible wavelengths of light with an average pitch on the subwavelength scale (i.e., 1 nm to 100 nm).

Referring now to FIGS. 4A through 4D, various embodiments of the method for forming various embodiments of the structure 10 are depicted. It is to be understood that all of the materials described in reference to FIGS. 3A through 3C may be used in any of the embodiments shown and discussed in reference to FIGS. 4A through 4D.

Figure 4A:
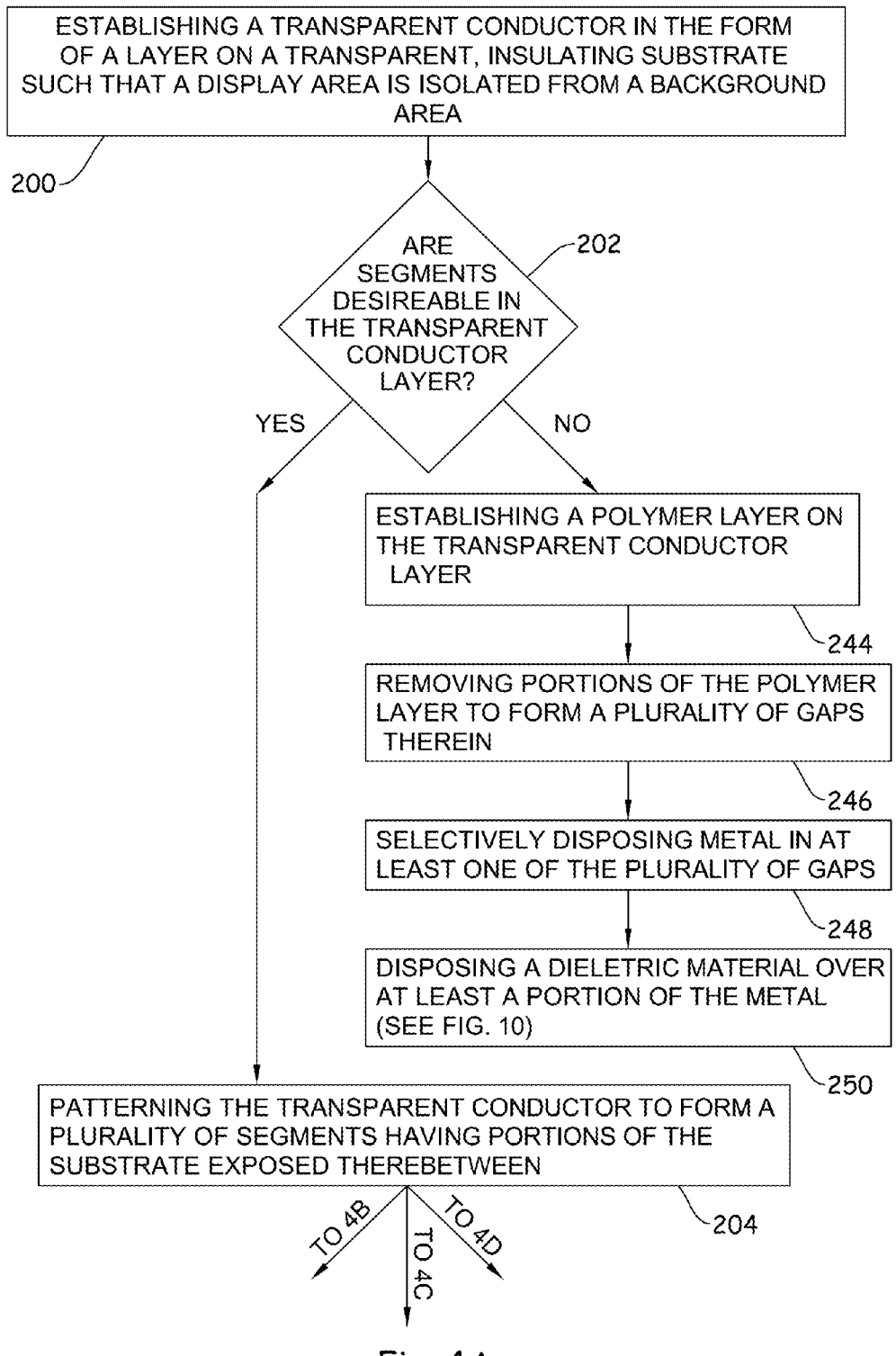
FIGS. 4A through 4D together illustrate a schematic flow diagram illustrating embodiments of the method for forming various embodiments of the transparent conductor structure.

In each embodiment of the method and as shown at reference numeral 200 of FIG. 4A, the transparent conductor is deposited or grown on the substrate 12 such that the transparent conducting layer 14 is formed, and such that the portion of the transparent conducting layer 14 in the display area DA is electrically isolated from the transparent conducting layer 14 in the background area BGA. As previously mentioned, in one embodiment the isolated sections of the transparent conducting layer 14 may be pre-patterned sections formed on the substrate 12, and in another embodiment, the isolated sections are formed by depositing or growing the transparent conducting layer 14 and then patterning the layer to form the respective areas DA and BGA. In the latter embodiment, the establishment of the transparent conducting layer 14 on the substrate 12 will depend upon the material used for the layer. Inorganic and organic materials or nanostructure networks may be deposited using physical and chemical vapor deposition processes, spin coating, spray coating, or any other suitable deposition process, and the subwavelength metal layer may be grown via self-assembly methods or established via lithographic methods. Once established to a suitable thickness, the layer 14 may be patterned into the isolated display area and background area sections using physical patterning techniques (such as laser ablation), plasma etching, or chemical patterning techniques (such as a wet etch process).

As shown in FIG. 4A, the method further includes determining whether segments 16, 18 are desirable (as opposed to a continuous conductor layer), as shown at reference numeral 202. When segments 16, 18 are desirable, the method further includes patterning the transparent conductor layer 14 (both portions in the display area DA and in the background area BGA) to form the segments 16, 18 (as shown at reference numeral 204). As previously described, the segments 16, 18 may be patterned into any desirable geometry, as long as each segment 16, 18 is capable of dissipating charge substantially uniformly therein. Patterning to form the segments 16, 18 may be accomplished via physical patterning techniques, plasma etching, or chemical patterning techniques. In one embodiment, the etching to define the areas DA, BGA takes place simultaneously with the etching of the segments 16, 18.

Since the resulting segments 16, 18 are isolated from one another, at least some portion of the transparent conductor layer 14 is removed during patterning. This results in exposed portions of the substrate 12 between adjacent segments 16, 18. In one embodiment, the distance between adjacent segments 16, 18 ranges from about 1 μm to about 500 μm. Larger area display applications, such as electronic signage, tend to have larger gaps, extending beyond 500 μm.

Figures 4B, 4D:
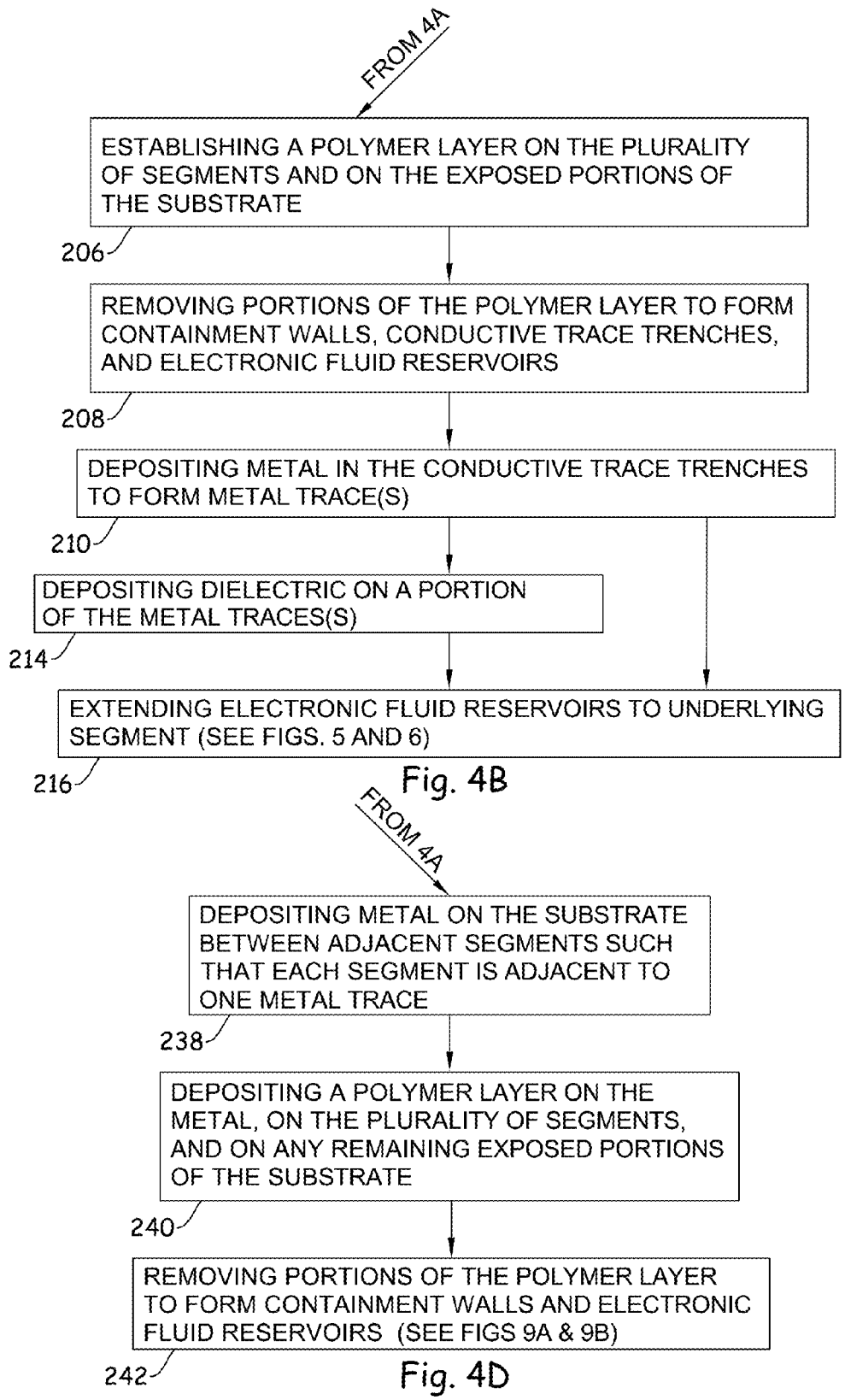

Various embodiments of the structure 10 may be formed with the segmented or discontinuous transparent layer 14 (including segments 16, 18). One embodiment of the method for forming embodiments of the structure 10, 10' (shown respectively in FIGS. 5 and 6) is shown in FIG. 4B at reference numerals 206 through 216. As such, FIGS. 4, 5 and 6 will now be referenced.

As illustrated at reference numeral 206 of FIG. 4B, a polymer layer 24 is established on the segments 16, 18 and in the area between adjacent segments 16, 18. Non-limiting examples of suitable polymer layers 24 include an insulating resin, such as embossing, photopolymerizable, and/or photocurable resins. Examples of such materials include epoxy based negative photoresist, SUB, or a base resin such as a low viscosity aliphatic urethane diacrylate. The polymer layer 24 may be applied via roll coating, gravure coating, spin coating, spray coating, screen printing, etc. The coated polymer layer 24 is thick enough to cover the segments 16, 18 and to be further processed to form various components of the resulting structure 10, 10'. In one embodiment, the polymer layer 24 is deposited to have a thickness ranging from about 1 μm to about 500 μm.

As shown at reference numeral 208, this embodiment of the method includes removing portions of the polymer layer 24 to form one or more containment walls 26, conductive trace trenches 28, and/or electronic fluid reservoirs 30 (all of which are shown in FIGS. 5 and 6). It is to be understood that the respective features 26, 28 and/or 30 may be patterned into the polymer layer 24 using photolithography, embossing, imprinting, or another suitable technique.

Containment walls 26 are configured to ultimately contain an electrically activatable medium (e.g., a medium including electrically responsive colorant particles therein) within a distinct viewing area VA (defined between adjacent walls 26, substrate 12, and another electrode 34 (shown in FIG. 11) opposed to the substrate 12), whether it be part of the display area DA or the background area BGA. As such, the containment walls 26 generally have a height that is greater than other features defined by the patterned polymer layer 24. In an embodiment, the height of walls 26 ranges from about 1 μm to about 100 μm. The positioning of the containment walls 26 may vary, depending upon the desirable location of the viewing areas VA within the final structure 10, 10'.

Conductive trace trenches 28 are recesses formed in the polymer layer 24 that extend through to one or more underlying conductive segments 16 or 18. It is to be understood that the trenches 28 may be configured so that the respective metal traces 20, 20' formed therein are all electrically connected (see, e.g., FIG. 2A). This is true of the embodiments shown in FIGS. 5 and 6. In particular, the conductive trace trenches 28 are configured as indented regions within the polymer layer 24 across the structure 10, 10' so that all of the metal traces 20' are electrically connected within the display area DA, and all of the metal traces 20 are electrically connected within the background area BGA. Furthermore, the trenches 28 are configured so that the metal traces 20 or 20' formed therein operatively connect to the underlying conductive segments 18 or 16 and operatively connect the conductive segments 18 or 16 to each other. It is to be understood however, that when a mesh of metal traces 20" is utilized (FIG. 3), additional trenches 28 may be formed in order to accommodate the crossing metal traces 20" included in the mesh.

Electronic fluid reservoirs 30 are defined between portions of the polymer layer 24 that remain in the final structure 10, 10' (see FIGS. 5 and 6). The positioning of the reservoirs 30 is such that each is physically isolated from the conductive trace trenches 28. Furthermore, the electronic fluid reservoirs 30 connect the viewing area VA to one or more underlying conductive segments 16, 18. Generally, it is desirable to include multiple reservoirs 30 per viewing area VA (and as shown in FIGS. 5 and 6, per conductive segment 16, 18).

The reservoirs 30 have been shown as lines. However, it is to be understood that the present embodiments are not to be limited in either shape or size of the reservoirs 30, as long as they satisfy the clear aperture ratio, optical contrast, and other operating requirements of the structure 10, 10'. They can be formed in circles, triangles, squares, rectangles, diamonds, stars, cones, inverse pyramids, or any other regular or non-regular shape. Similarly, there is no requirement that all of the reservoirs 30 be the same size. The reservoirs 30 can be sized such that size varies in either a periodic or an aperiodic stochastic fashion.

Once the initial pattern (for the walls 26, trenches 28, and reservoirs 30) is formed in the polymer layer 24, various etching steps may be performed in order to achieve the desired final geometry of each of the patterned components. For example, the initial pattern may be such that the trenches 28 and/or the reservoirs 30 do not extend through to an underlying segment 16, 18. In such instances, etching may be performed to clear the trenches 28 and/or the reservoirs 30 of polymer material 24 remaining therein. Generally, if one or more etching steps are required to remove residual polymer layer 24, the etchant selected will not deleteriously affect the underlying segment 16, 18. Generally, etching will remove polymer 24 evenly. However, by changing the embossing depth and etch time, the etching processes may be differentiated so that desirable etched areas are different. For example, if one embossed feature is deep and another is shallow, the etching parameters may be controlled so as to clear the polymer 24 form the deep embossed feature while leaving polymer 24 in the bottom of the shallow feature. It is to be understood that any residual polymer layer 24 may be removed during a subsequent etch step, after additional processing takes place, if desired.

If etching is needed to clear out the trenches 28 and the reservoirs 30, the etching steps may be accomplished simultaneously or sequentially. Two embodiments utilizing sequential etching steps are discussed in reference to reference numerals 210 and 216 and reference numerals 210, 214, 216 of FIG. 4B.

A selective etching process is used to first remove any residual polymer 24 from the conductive trace trenches 28. As shown at reference numeral 210, once the conductive trace trenches 28 are clear of the polymer layer 24 (i.e., a portion of the underlying segments 16, 18 is exposed), a metal may be selectively deposited into the conductive trace trenches 28 to form the metal traces 20, 20'. The selective deposition of the metal may be accomplished via electroplating, electroless plating, or photo processes, such as deposition or sputtering. It is to be understood that in the embodiments of the structure 10, 10' shown in FIGS. 5 and 6, the metal traces 20, 20' are in the form of lines that electrically connect the various segments 18, 16 throughout the background area BGA and the display area DA, respectively (similar to the traces 20, 20' shown in FIG. 2A).

Once the metal traces 20, 20' are formed, one embodiment of the method includes performing the additional etching process to clear the reservoirs 30 of residual polymer layer 24 (as shown at reference numeral 216). As previously described, this extends or opens up the reservoir 30 to the underlying segment 16 or 18. The resulting structure 10 is shown in FIG. 5.

In another embodiment, after the metal traces 20, 20' are formed, the method includes selectively depositing a dielectric layer 32 on a portion of the metal traces 20, 20', as shown at reference numeral 214. The dielectric layer 32 is advantageously used in embodiments when it is desirable to substantially prevent the metal traces 20, 20' from drawing colorant particles (of, e.g., an electronic fluid in the viewing area VA) to the traces 20, 20' during use. When the dielectric layer 32 is not included and electrical signals are transmitted through the trace(s) 20, 20', charged colorant particles may be drawn toward the traces 20, 20', and charge transfer takes place between the particles and the traces 20, 20'. While this may be desirable in some instances (see FIG. 5), in other instances, particle/trace interaction is undesirable. Incorporating the dielectric layer 32 on the metal traces 20, 20' at certain areas prevents such charge transfer by isolating the traces 20, 20' from the colorants.

It is to be understood that at least a portion of the metal traces 20, 20' does remain exposed (i.e., not covered by the dielectric layer 32) after deposition of the dielectric layer 32. The uncovered portion is generally at an area where the metal traces 20, 20' are operatively connected to an underlying segment 16, 18. This enables the metal traces 20, 20' to contribute to switching (i.e., compaction and spreading of e.g., the electronic fluid, described further hereinbelow) at desirable areas, while also isolating the metal traces 20, 20' so that charges are transmitted to the segments 16, 18 instead of to the colorant particles.

Non-limiting examples of suitable materials for the dielectric layer 32 include insulating resins such as those discussed hereinabove. In some instances, the insulating resin has a white reflector or a black absorber embedded thereon. The dielectric layer 32 may be selectively deposited on the desired portions of the metal traces 20, 20' via electrolytic plating, electroless plating, or deposition or sputtering with photo processes.

It is to be understood that the addition of the dielectric layer 32 to the structure 10' (shown in FIG. 6) may be especially useful in electrokinetic displays where electrochemistry plays a role in addition to electrophoresis for compaction of charged colorants. By covering most of the traces 20, 20' with the dielectric layer 32, the metal traces 20, 20' responding to an applied bias are substantially prevented from becoming visible in the viewing area because the colorants are prevented from becoming drawn thereto (or repulsed thereby when the applied field is reversed).

In this embodiment of the method, the structure 10' is formed after the subsequent etching of the reservoirs 30 takes place to extend such reservoirs 30 through to the underlying segment 16, 18, as shown at reference numeral 216. The etching of the reservoirs 30 may be accomplished as previously described.

Figure 4C:
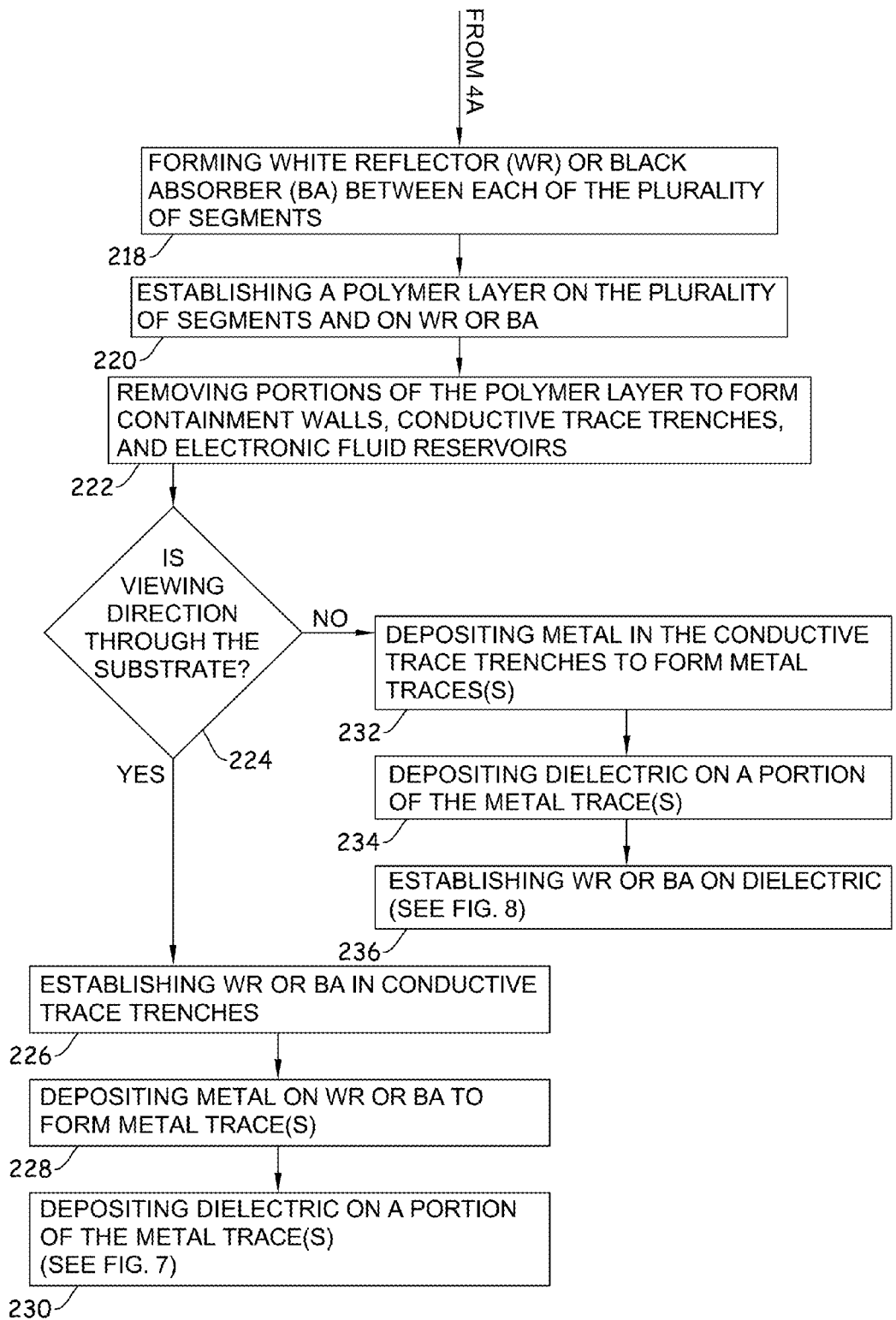

Other embodiments of the method for forming embodiments of the structure 10", 10''' (shown respectively in FIGS. 7 and 8) are shown in FIG. 4C at reference numerals 218 through 230 and at reference numerals 218-224 and 232-236. As such, FIGS. 4A, 4C, 7 and 8 will now be referenced.

As illustrated in FIG. 4A at reference numerals 202 and 204, segments 16, 18 are formed in the conducting layer 14 as described hereinabove. In this embodiment of the method, prior to depositing and patterning the polymer layer 24, a white reflector or black absorber WR/BA is selectively formed between the respective segments 16, 18. It is to be understood that when established between conducting segments 16, 18, the white reflector or black absorber WR/BA is selected to be non-conducting. Non-limiting examples of such non-conducting white reflectors or black absorbers WR/BA include insulating resins containing white or black pigments or multi-layer dielectric stacks that are optimized for a certain reflective property (e.g., reflectance or absorbance) based on interference. While both the structures 10", 10''' shown in FIGS. 7 and 8, respectively, include the non-conducting white reflectors or black absorbers WR/BA between the segments 16, 18, it is to be understood that this material may be omitted from the structures. However, these areas of the structure 10", 10''' are inactive during use, and the use of such material improves the white or dark state of the resulting display element 1000.

Figure 7:
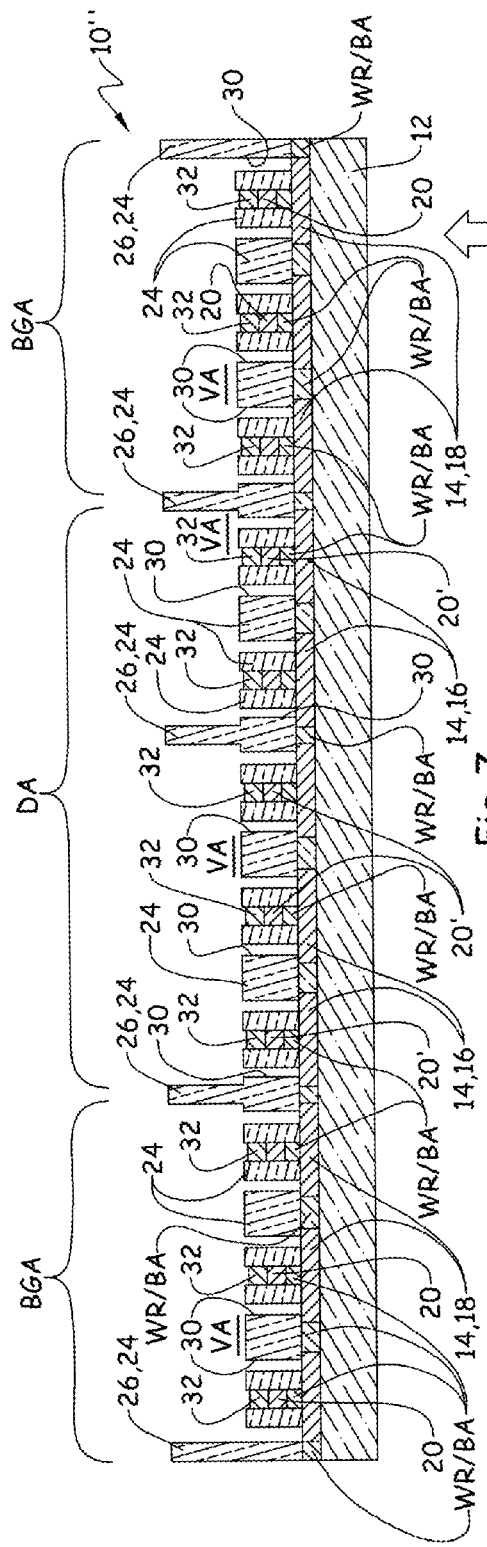
FIG. 7 is a cross-sectional view of one embodiment of the transparent conductor structure including a dielectric material established on a portion of the metal traces and a white reflector or black absorber positioned between the metal traces and the conductive segments.
Figure 8:
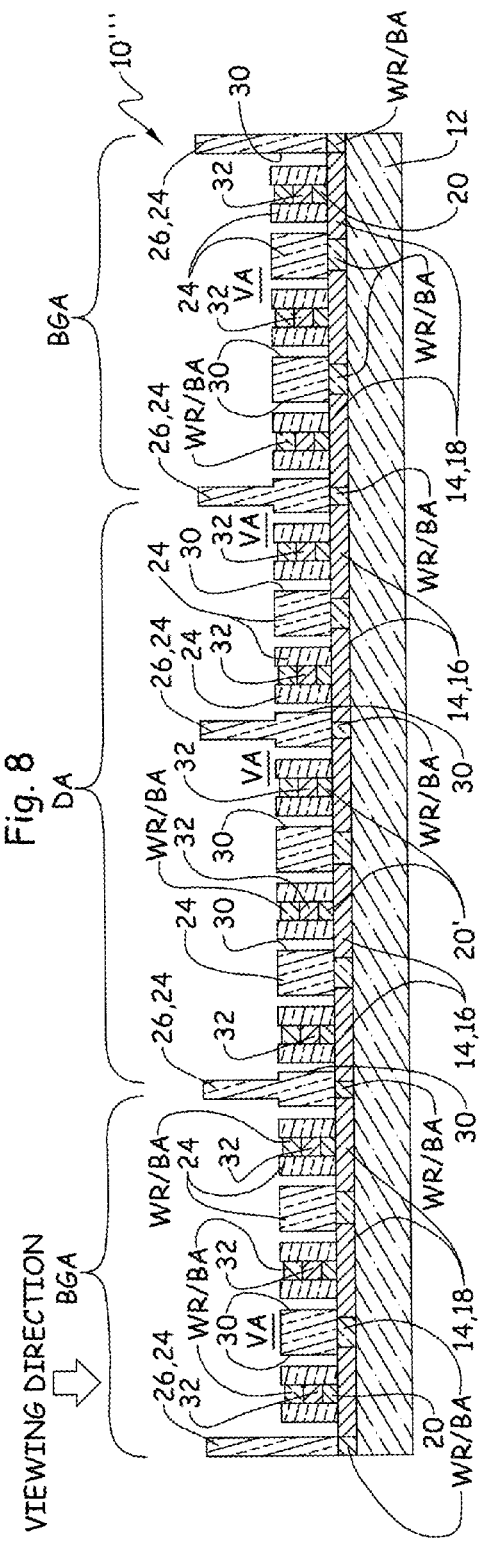
FIG. 8 is a cross-sectional view of one embodiment of the transparent conductor structure including a dielectric material established on a portion of the metal traces and a white reflector or black absorber on the dielectric material.

As shown at reference numerals 220 and 222, the polymer layer 24 is then i) deposited on the conductive segments 16, 18 and on the non-conducting white reflectors or black absorbers WR/BA established between the segments, and ii) patterned to form the desirable walls 26, conducting trace trenches 28 (which in FIGS. 7 and 8 are filled with metal traces 20 or 20', dielectric 32, and white reflector or black absorber material WR/BA), and reservoirs 30. The establishment of the polymer layer 24 and the formation of the various components formed therein or therefrom may be accomplished as previously described.

In this embodiment and as shown at reference numeral 224 of FIG. 4C, it is then determined whether the viewing direction will be through the substrate 12 or through another transparent electrode 34 (FIG. 11) opposed to the substrate 12 (not shown in FIGS. 7 and 8).

The embodiment shown in FIG. 7 is the resulting structure 10" when the viewing direction is through the substrate 12. As such, FIGS. 4C and 7 will now be discussed. As shown at reference numeral 226 of FIG. 4C, another white reflector or black absorber material WR/BA is deposited in the conductive trace trenches 28. In this embodiment, the white reflector or black absorber WR/BA is positioned between the conducting segments 16, 18 and the metal traces 20, 20', and thus the white reflector or black absorber WR/BA is conductive in order to transfer the charges from the traces 20, 20' to the segments 16, 18. Non-limiting examples of conductive white reflector or black absorber WR/BA materials include conductive resins containing white or black pigments or multi-layer conductive materials stacks that are optimized for a certain reflective property.

As shown at reference numerals 228 and 230, after the conducting white reflector or black absorber WR/BA material is established, the metal is deposited thereon to form the metal traces 20, 20', and if desirable, the dielectric layer 32 is deposited on the metal traces 20, 20'. Any of the previously described material and methods may be used to establish the traces 20, 20' and the dielectric layer 32. Furthermore, it is to be understood that if the reservoirs 30 are not cleared of polymer layer 24 after formation of the structure components (e.g., 20, 20', 32, etc.), etching may be accomplished to remove such polymer layer 24 so that the reservoirs 30 fluidly connect the viewing area VA to the respective conductive segments 16, 18.

FIG. 8 illustrates another embodiment of the structure 10''' when the viewing direction is not through the substrate 12. As such, FIGS. 4C and 8 will now be discussed. As shown at reference numerals 232 and 234 of FIG. 4C, the metal is deposited in the conductive trenches 28 to form the metal traces 20, 20', and if desirable, the dielectric layer 32 is then deposited on the metal traces 20, 20'. Any of the previously described materials and methods may be used to establish the traces 20, 20' and, when desirable, the dielectric layer 32.

As shown at reference numeral 236, a white reflector or black absorber material WR/BA is deposited in the conductive trace trenches 28 on the dielectric material 32 (or on the metal traces 20, 20' if the dielectric material 32 is not included). In this embodiment, the white reflector or black absorber WR/BA is non-conductive. Non-limiting examples of suitable non-conductive white reflector or black absorber WR/BA materials are described hereinabove. This white reflector or black absorber WR/BA may be established to fill the conductive trace trenches 28. In this embodiment, the white reflector or black absorber WR/BA essentially functions as both the WR/BA and the dielectric material 32. As such, while in FIGS. 7 and 8, the WR/BA layer and the adjacent dielectric layer 32 are illustrated as being separate layers, it is to be understood that such layers may be configured into a single layer (i.e., a dielectric layer 32 that is configured to exhibit a particular reflective property).

While not shown in FIG. 4C in reference to this particular embodiment, it is to be understood that if the reservoirs 30 are not cleared of polymer layer 24 after deposition of the non-conductive white reflector or black absorber WR/BA materials, etching may be accomplished to remove such polymer layer 24 so that the reservoirs 30 fluidly connect the viewing area VA to the respective conductive segments 16, 18.

Referring now to FIGS. 4D (reference numerals 238-242) and 9A, still another embodiment of the method of forming another embodiment of the device 10'''' is depicted. In this embodiment (as shown at reference numeral 204), the transparent conductor layer 14 is deposited and patterned to form the segments 16, 18. As shown at reference numeral 238, the metal is then selectively deposited on the substrate 12 in the spaces between some of the adjacent segments 16, 18 to form traces 20, 20'. It is to be understood that it is desirable that a single metal trace 20 or 20' be electrically connected to two adjacent segments 16, 18, and that such segments 16, 18 also be electrically isolated from other adjacent segments 16, 18. In other words, the metal traces 20, 20' are deposited in a manner that electrically connects such traces 20, 20' to adjacent segments 16, 18 without inducing shorting. In the example shown in FIG. 9A, a trace 20, 20' is formed in the space between every other segment 16, 18.

Once the metal traces 20, 20' are established, the polymer layer 24 is deposited on the conducting segments 16, 18, on the traces 20, 20', and on the remaining exposed portions of the substrate 12 between segments 16, 18, as shown at reference numeral 240. The polymer layer 24 may be any non-conducting resin, and may be established using techniques previously described. As shown at reference numeral 242, portions of the polymer layer 24 are then removed to form one or more containment walls 26 and electronic fluid reservoirs 30. In this embodiment, at least some of the containment walls 26 are formed over the conductive traces 20, 20'. This configuration substantially prevents further reduction of the clear aperture ratio due to the metal traces 20, 20'. This is due to the fact that the wall 26 (which results in some reduction of the clear aperture ratio) is formed over the traces 20, 20' and thus any potential reduction that would result from the traces 20, 20' is mitigated by virtue of the overlying wall 26.

While not shown in FIG. 4D in reference to this particular embodiment, it is to be understood that if the reservoirs 30 are not cleared of polymer layer 24 after their formation, etching may be accomplished to remove such polymer layer 24 so that the reservoirs 30 fluidly connect the viewing area VA to the respective conductive segments 16, 18.

FIG. 9B illustrates the embodiment of FIG. 9A with a dielectric material 32 (which may be configured as a white reflector or black absorber WR/BA) established on inactive regions. This configuration, designated generally as 10''', further assists in achieving the desirable clear aperture ratio.

Figure 10:
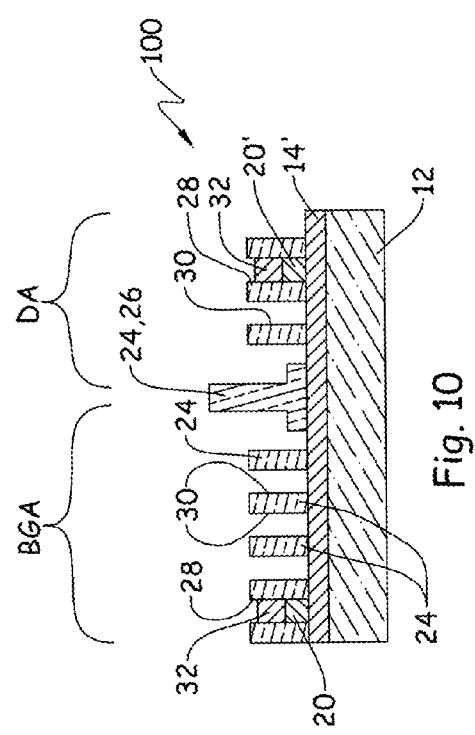
FIG. 10 is a cross-sectional view of one embodiment of the transparent conductor structure including a continuous transparent conductor layer.

FIG. 4A (at reference numerals 244-250) and FIG. 10 illustrate the formation of another embodiment of the structure 100. In this embodiment, segments 16, 18 are not desirable, and thus the conductive layer 14' is deposited as a continuous layer, as shown in FIG. 8. It is to be understood that FIG. 8 illustrates a portion of the display area DA and a portion of the background area BGA.

In this embodiment, the polymer layer 24 is deposited on the conductive layer 14', and is patterned to form one or more containment walls 26, conductive trace trenches 28, and electronic fluid reservoirs 30 (as shown at reference numerals 244 and 246). Metal is deposited in the trenches 28 to form traces 20 and 20'. As shown in FIG. 10 and at reference numeral 250, in this embodiment, the dielectric material 32 is then deposited on the traces 20, 20'.

In any of the embodiments disclosed herein, the structures 10, 10', 10'', 10''', 10'''', $10^V$ and 100 may include second metal trace(s) 20, 20' operatively connecting segments 16, 18. Such additional traces are redundant traces that contribute to the reliability of the structure 10, 10', 10'', 10''', 10'''', $10^V$ and 100. It is to be understood that such additional traces are similar to trace(s) 20, 20' and may be used when they would not deleteriously affect the desired clear aperture ratio of the structure 10, 10', 10'', 10''', 10'''', $10^V$ and 100. One non-limiting example of redundant traces is the mesh 20'' discussed above and shown in FIG. 3.

While not shown, it is to be understood that the segments 16, 18 of the structures 10, 10', 10'', 10''', 10'''' and $10^V$ may include anti-reflective coatings to improve the optical transmission by reducing surface reflectance due, at least in part, to Fresnel reflection. Surface Fresnel reflection is typically about 4% at an interface for glass/air and is a function of index mismatch. By incorporating a subwavelength structure as an anti-reflective coating, it may be possible to reduce the reflection down to less than 1% as light passes multiple times through the structure 10 (e.g., in a stacked structure formed to achieve full color).

Figure 11:
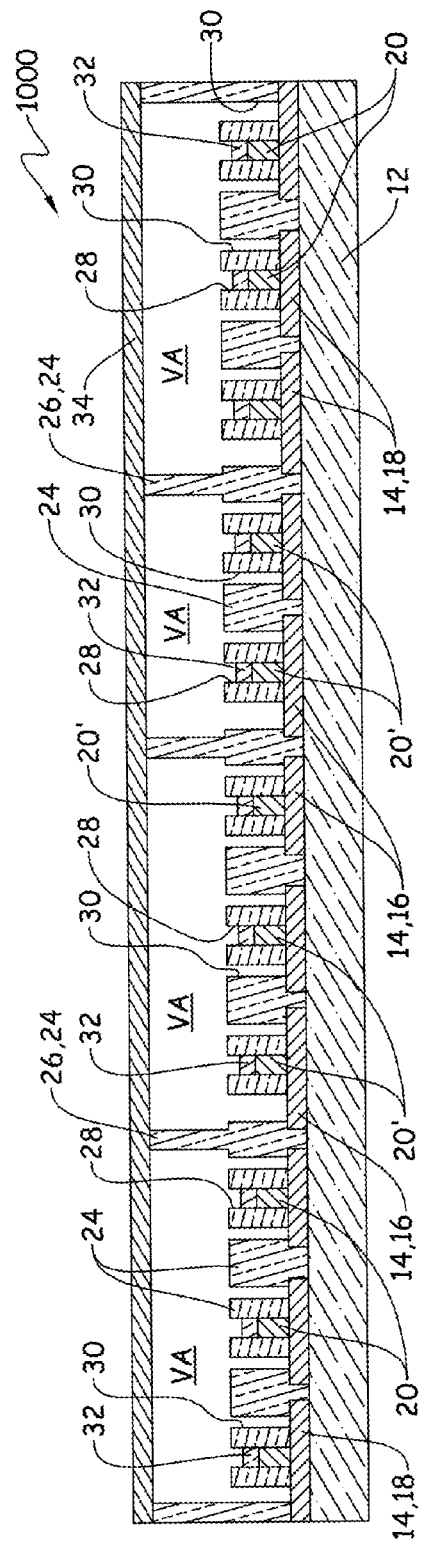
FIG. 11 is a cross-sectional view, taken along line 11-11 of FIGS. 1A and 1B, of one embodiment of a display element incorporating one embodiment of the transparent conductor structure.

FIG. 11 illustrates an embodiment of the structure 10 incorporated into a display element 1000. It is to be understood that any of the previously described embodiments 10, 10', 10'', 10''', 10'''', $10^V$ and 100 may be incorporated into such a display element 1000. The display element 1000 includes an electrically activatable medium disposed in the viewing area (s) VA, which is in fluid communication with the reservoirs 30. As used herein, an "electrically activatable medium" refers to a carrier fluid that fills up the entire viewing area VA and the reservoirs 30. The electrically activatable medium includes a plurality of colorant particles (not shown) dispersed therein. In response to a sufficient electric potential or field, the colorant particles move and/or rotate to various spots within the viewing area VA, the reservoir 30, or both in order to produce desired visible images during one or more stages of an addressing sequence. Non-limiting examples of electrically activatable mediums include electrophoretic mediums, electronic inks or fluids, anisotropic mediums such as liquid crystals, and/or the like. The electrically activatable medium may be transparent, colored, or dyed.

The colorant particles dispersed in the medium may, in an embodiment, include a single type of particle (such as, e.g., the same color, the same charge, etc.) or, in another embodiment, include two or more types of particles (such as, e.g., two or more different colors, different charges, etc.). In one embodiment, the colorant particles may include a mixture of two different types of colorant particles. In this example, the first type of colorant particles displays a first color, while a second type of colorant particles displays a second color. The mixture of the different types of colorant particles may also be included in a transparent medium, a colored medium, or a dyed medium.

Once the electrically activatable medium is disposed in the viewing areas VA, the display element 1000 is sealed by establishing a transparent conducting electrode 34 on the walls 26, as shown in FIG. 11. The transparent conducting electrode 34 may be formed of ITO or another suitable transparent and conducting material (such as those described herein for 14, 16, 18). Depending upon how the display element 1000 is to be addressed, the electrode 34 i) may include electrically connected segmented plates (connected with driving circuitry by linear or non-linear electrical elements (i.e., metal traces 20', 20'), wherein such plates contribute to a pixelated array of electrodes), or ii) may be an essentially one-dimensional line electrode, or iii) may include physically and electrically isolated segments (i.e., essentially two dimensional conductive plates which are electrically isolated from each other and are addressed individually and independently of each other). An essentially one-dimensional line electrode has one dimension that is larger than another dimension (e.g., length is much greater than diameter). An essentially two-dimensional conductive plate has a cross-sectional area that is significant compared to the area of the display element 1000.

Embodiments of the display D, D' further include electrical contacts configured to apply an appropriate electric potential to at least one of the electrodes 16, 18, 34 when driving the display D, D' to produce a visual image. In an example, the electrical contacts may be situated along a side of the display D, D', where the electric potential or field is applied to the electrode 16, 18, 34 from a side of each structure 10, 10', 10'', 10''', 10'''', 10$^V$ and 100. In another example, electrical connection of at least one of the electrodes 16, 18, 34 may be accomplished using a backplane. The backplane may, for example, include the electrodes configured to drive the display D, D' and suitable hardware configured to drive the electrodes 16, 18, 34. In some instances, the backplane includes additional elements such as power supply lines and the like.

The present disclosure also includes circuitry suitable for driving the display D, D'. It is to be understood that this circuitry (non-limiting examples of which are shown in FIGS. 1A and 1B) may include, but is not limited to software, hardware, firmware, and/or the like, and/or combinations thereof.

The structures 10, 10', 10'', 10''', 10'''', 10$^V$ and 100 disclosed herein are hybrid structures of metal and transparent conductor, which improve the switching speed of a display element 1000 in which they are incorporated, e.g., by reducing the trace resistance. The embodiments disclosed herein, which include relatively thin transparent conductors, improve transparency, brightness, and robustness of the display D, D', and also allow for a relatively small bend radius.

While several embodiments have been described in detail, it will be apparent to those skilled in the art that the disclosed embodiments may be modified. Therefore, the foregoing description should be considered as providing one or more illustrative examples.

What is claimed is:

1. A transparent conductor structure, comprising:
a transparent, insulating substrate; and
a discontinuous, transparent conducting charge-dissipating layer established on the substrate, the discontinuous conducting layer partitioned into a plurality of discrete segments having gaps between adjacent discrete segments, at least two of the plurality of discrete segments being a transparent electrode, each of the plurality of segments having a thickness ranging from about 1 nm to about 10 μm, the plurality of segments having two or more segments operatively connected together by i) a metal trace operatively disposed on or between the two or more segments, or ii) a mesh, formed from a plurality of the metal traces, operatively disposed across a surface of the plurality of segments;
wherein the transparent conducting charge-dissipating layer and the metal trace or the mesh of metal traces is to enable electric charge to be substantially uniformly distributed across the surface of the transparent conductor structure;
and wherein the transparent conductor structure is incorporated into a display element and has a clear aperture ratio ranging from 50% to 99%, the clear aperture ratio being the ratio of a transparent region area to a total area of the display element including transparent and opaque regions.

2. The transparent conductor structure as defined in claim 1 wherein the conducting layer is selected from an inorganic transparent conductor, an organic transparent conductor, a subwavelength structured metal layer, a thin transparent metal layer, a network of nanostructures, and combinations thereof.

3. The transparent conductor structure as defined in claim 2 wherein: the thickness of each of the plurality of segments of the conducting layer ranges from about 5 nm to about 1000 nm when the conducting layer is formed from the inorganic transparent conductor; the thickness of each of the plurality of segments of the conducting layer ranges from about 10 nm to about 3 μm when the conducting layer is formed from the organic transparent conductor; the thickness of each of the plurality of segments of the conducting layer ranges from 1 nm to about 100 nm when the conducting layer is formed from the subwavelength structured metal layer; the thickness of each of the plurality of segments of the conducting layer ranges from about 1 nm to about 50 nm when the conducting layer is formed of the thin transparent metal layer; or the thickness of each of the plurality of segments of the conducting layer ranges from 3 nm to about 300 nm when the conducting layer is formed from a network of nanostructures.

4. The transparent conductor structure as defined in claim 1 wherein the metal trace or the mesh of metal traces is formed from a material selected from an electrically conductive metal, alloys thereof, and combinations thereof.

5. The transparent conductor structure as defined in claim 1 wherein the display element has at least one wall, and wherein the metal trace or the mesh of metal traces is defined below the at least one wall in a manner sufficient to substantially prevent reduction, due to the metal trace or the mesh of metal traces, of the clear aperture ratio.

6. The transparent conductor structure as defined in claim 1 wherein each of the plurality of segments includes a geometry that is to facilitate the enabling of the substantially uniformly distributed electric charge.

7. The transparent conductor structure as defined in claim 1 wherein the two or more segments are operatively connected together by the metal trace disposed on or between the two or more segments, and wherein the structure further comprises at least one other metal trace operatively disposed on or between the two or more segments.

8. The transparent conductor structure as defined in claim 1, further comprising a dielectric material disposed on at least a portion of the metal trace or the mesh of metal traces.

9. The transparent conductor structure as defined in claim 8 wherein the dielectric material is: i) disposed above one of a white reflector or a black absorber, the metal trace or mesh being disposed between the dielectric material and the one of the white reflector or the black absorber; ii) disposed below one of the white reflector or the black absorber; or iii) formed from one of the white reflector or the black absorber.

10. The transparent conductor structure as defined in claim 1, further comprising a dielectric material formed from one of a white reflector or a black absorber disposed in inactive regions.

11. The transparent conductor structure as defined in claim 1 wherein the metal trace or the mesh of metal traces has a predefined surface selected from structured surfaces, textured surfaces, porous surfaces, and combinations thereof, the predefined surface configured to be a white reflector or a black absorber.

12. The transparent conductor structure as defined in claim 1 wherein the transparent conductor structure is flexible.

13. The transparent conductor structure as defined in claim 5 wherein the clear aperture ratio ranges from 90% to 99%.

14. The transparent conductor structure as defined in claim 1 wherein the display element is driven via one of passive matrix addressing, active matrix addressing, or direct addressing.

15. The transparent conductor structure as defined in claim 1 wherein the display element is driven via passive matrix addressing.

16. The transparent conductor structure as defined in claim 1 wherein the at least two of the plurality of discrete segments is arranged in any of rows or columns, each of the rows or columns respectively being a transparent row electrode or a transparent column electrode.

17. A transparent conductor structure, comprising:
a transparent, insulating substrate;
a discontinuous, transparent conducting charge-dissipating layer established on the substrate, the discontinuous conducting layer partitioned into a plurality of discrete segments having gaps between adjacent discrete segments, at least two of the plurality of discrete segments being a transparent electrode, each of the plurality of segments having a thickness ranging from about 1 nm to about 10 μm, the plurality of segments having two or more segments operatively connected together by i) a metal trace operatively disposed between the two or more segments, or ii) a mesh, formed from a plurality of the metal traces, operatively disposed across a surface of the plurality of segments, wherein the transparent conducting charge-dissipating layer and the metal trace or the mesh of metal traces is to enable electric charge to be substantially uniformly distributed across the surface of the transparent conductor structure; and
a dielectric material formed from one of a white reflector or a black absorber disposed in inactive regions;
wherein the transparent conductor structure is incorporated into a display element having at least one wall, and wherein the metal trace or the mesh of metal traces is defined below the at least one wall in a manner sufficient to substantially prevent reduction, due to the metal trace or the mesh of metal traces, of a clear aperture ratio.

18. The transparent conductor structure as defined in claim 17 wherein the clear aperture ratio is the ratio of a transparent region area to a total area of the display element including transparent and opaque regions, and wherein the clear aperture ratio ranges from 90% to 99%.

19. The transparent conductor structure as defined in claim 17 wherein the display element is driven via one of passive matrix addressing, active matrix addressing, or direct addressing.

20. The transparent conductor structure as defined in claim 17 wherein the display element is driven via passive matrix addressing.

21. The transparent conductor structure as defined in claim 17 wherein the at least two of the plurality of discrete segments is arranged in any of rows or columns, each of the rows or columns respectively being a transparent row electrode or a transparent column electrode.

22. The transparent conductor structure as defined in claim 17 wherein the display element includes a viewing area, and wherein the viewing area includes an electrically activatable medium disposed therein.

* * * * *